(12) United States Patent
Moss

(10) Patent No.: US 11,402,982 B2
(45) Date of Patent: Aug. 2, 2022

(54) GRAPHICAL INTERFACE FOR INJECTION MOLDING SYSTEMS

(71) Applicant: Synventive Molding Solutions, Inc., Peabody, MA (US)

(72) Inventor: Mark Moss, Boxford, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 245 days.

(21) Appl. No.: 15/650,472

(22) Filed: Jul. 14, 2017

(65) Prior Publication Data

US 2019/0018579 A1    Jan. 17, 2019

(51) Int. Cl.

| | | |
|---|---|---|
| *G06F 3/04847* | (2022.01) | |
| *B29C 45/76* | (2006.01) | |
| *B29C 45/77* | (2006.01) | |
| *B29C 45/78* | (2006.01) | |
| *B29C 45/80* | (2006.01) | |

(Continued)

(52) U.S. Cl.
CPC .......... *G06F 3/04847* (2013.01); *B29C 45/76* (2013.01); *B29C 45/766* (2013.01); *B29C 45/77* (2013.01); *B29C 45/78* (2013.01); *B29C 45/80* (2013.01); *G05B 19/409* (2013.01); *B29C 2045/7606* (2013.01); *B29C 2945/7604* (2013.01); *B29C 2945/76006* (2013.01); *B29C 2945/76083* (2013.01); *B29C 2945/76274* (2013.01); *B29C 2945/76498* (2013.01); *B29C 2945/76531* (2013.01); *B29C 2945/76568* (2013.01); *B29C 2945/76752* (2013.01); *B29K 2105/0067* (2013.01); *G06F 3/0482* (2013.01);

(Continued)

(58) Field of Classification Search
CPC ... G06F 3/04847; B29C 45/76; B29C 45/766; B29C 45/77; B29C 45/78; B29C 45/80; B29C 2045/7606; G05B 19/409
See application file for complete search history.

(56) References Cited

U.S. PATENT DOCUMENTS 5,325,287 A    6/1994  Spahr
6,258,303 B1   7/2001  Hibi
(Continued)

FOREIGN PATENT DOCUMENTS

DE    10 2004 052499 A1    7/2006
EP         1488904 A2       12/2004

OTHER PUBLICATIONS

International Search Report and Written Opinion in corresponding international application No. PCT/US2018/033692 dated Jan. 2, 2019.

(Continued)

*Primary Examiner* — Andrew T Chiusano
(74) *Attorney, Agent, or Firm* — Polsinelli, P.C.

(57) ABSTRACT

System and method for monitoring system parameters from multiple independent controllers that monitor and control an injection process is a plurality of IMSs, including: establishing a common graphical user interface (common GUI) for viewing system parameters of a tool based injection molding system (IMS), the IMS including a plurality of different local controllers that control different tool based system functions of the IMS and one common graphical user interface (local GUI) with GUI routines specific to the local controllers for set up and monitoring of the respective tool based system function of the respective local controllers.

18 Claims, 4 Drawing Sheets

(51) Int. Cl.
*G06F 3/04817* (2022.01)
*G06F 3/0482* (2013.01)
*G05B 19/409* (2006.01)
*B29K 105/00* (2006.01)
*G06F 3/04845* (2022.01)

(52) U.S. Cl.
CPC ...... *G06F 3/04817* (2013.01); *G06F 3/04845* (2013.01)

(56) References Cited

U.S. PATENT DOCUMENTS

| | | | | |
|---|---|---|---|---|
| 6,684,264 B1* | 1/2004 | Choi | ........................ | B29C 45/76 700/201 |
| 7,580,771 B2* | 8/2009 | Quail | .................... | B22D 17/007 700/197 |
| 2002/0031567 A1* | 3/2002 | Magario | ................. | B29C 45/76 425/135 |
| 2006/0235568 A1* | 10/2006 | Araki | ....................... | B29C 45/76 700/200 |
| 2007/0157089 A1* | 7/2007 | Van Os | ............... | G06F 3/04817 715/702 |
| 2010/0332018 A1* | 12/2010 | Chen | ....................... | B29C 45/76 700/201 |
| 2011/0106284 A1 | 5/2011 | Catoen | | |
| 2011/0160895 A1* | 6/2011 | Chen | ....................... | B29C 45/76 700/200 |
| 2011/0316180 A1* | 12/2011 | Starkey | ................... | B29C 45/17 264/40.1 |
| 2012/0185077 A1 | 7/2012 | Mueller | | |
| 2013/0103794 A1* | 4/2013 | Starkey | ................ | G05B 19/406 709/217 |
| 2014/0046465 A1 | 2/2014 | de Oliveira Antunes | | |
| 2014/0367892 A1* | 12/2014 | Stone | .................... | B29C 45/281 425/549 |
| 2015/0106912 A1* | 4/2015 | Brandon | ................. | B29C 45/76 726/13 |
| 2018/0345555 A1* | 12/2018 | Uchiyama | ............... | B29C 45/76 |

OTHER PUBLICATIONS

Written Opinion of the International Preliminary Examining Authority in corresponding international application No. PCT/US2018/033692 dated May 31, 2019.

* cited by examiner

GRAPHICAL INTERFACE FOR INJECTION MOLDING SYSTEMS

FIELD OF THE INVENTION

The present invention relates to injection molding systems, and more specifically to a graphical interface for monitoring system data from multiple independent controllers that monitor and control an injection molding process.

BACKGROUND OF THE INVENTION

Injection molding systems are becoming more and more complex, incorporating an ever increasing number of separate control systems and sensors. A local operator may need to monitor five or more independent controllers, each restricted to a particular system parameter and utilizing different protocols and display formats.

The problem is further compounded when a customer is running multiple molds in different plants and countries around the world. Each of these molds is a significant investment and the expectation is that the mold will be up and running 24/7 (24 hours a day, 7 days a week). When a mold goes down, the customer's promised delivery dates (i.e., supplying a designated quantity of molded product in a defined time period) cannot be met. One alternative is to stockpile spare molds, an expensive option that still does not eliminate the process time required for setting up a machine with the new mold. Alternatively, one can attempt to shift production to another location, assuming there is another location or machine with spare capacity.

Shifting production and stockpiling molds may be a short term solution to a mold malfunction, but it fails to solve the over-riding problem of monitoring multiple control systems. One approach is to try and unify the control systems at the machine level. While this may be sufficient for a localized (single plant) operation with one set of equipment and an experienced local operator, it does not scale to large numbers of molds and plants around the world, having operators with varying degrees of expertise and disparate equipment and communication systems.

Thus there is a need for more effective monitoring of multiple independent controllers utilized in modern injection molding systems across different mold tools, manufacturing plants, and molding processes.

SUMMARY OF THE INVENTION

In one embodiment, a system is provided comprising:
one or more processors; and
at least one computer-readable storage medium having stored therein instructions which, when executed by the one or more processors, cause the one or more processors to:
establish a common graphical user interface (common GUI) for viewing system parameters of a tool based injection molding system (IMS), the IMS including a plurality of different local controllers that control different tool based system functions of the IMS and one common graphical user interface (local GUI) with GUI routines specific to the local controllers for set up and monitoring of the respective tool based system function of the respective local controllers;
provide set up parameters, to each of the local controllers, for establishing the injection molding processes
receive, from each of the local controllers, data indicating a local state of the respective tool based system function;
propagate to the common GUI one or more common views of the set up parameters and received local states of the various tool based system functions, the common views comprising a common set of graphical routines for set up and monitoring of the tool based system functions of the IMS and for providing input to one or more of the local controllers.

In such an embodiment, the IMS can include an injection molding machine, a mold and a hot runner system, and the local controllers operate the mold and the hot runner system.

In such an embodiment, the local controllers can include one or more of a hot runner temperature controller, a valve pin position controller, a mold cavity sensor controller and a mold temperature controller.

In such an embodiment, the common set of graphical routines can include common icons, colors and graphical details.

In such an embodiment, a further step can include:
receive, from the common GUI, a user input requesting display of one or more of the common views relating to one or more user selected tool based system functions.

In such an embodiment, a further step can include:
propagate to the common GUI the requested one or more common views.

In such an embodiment, a further step can include:
receive, from one or more of the local controllers, data indicating an updated local state of the respective system function; and
propagate to the common GUI one or more common views of the updated local state.

In such an embodiment, receive data from the local controllers from a plurality of injection molding systems (IMSs), and wherein the common graphical routines include routines for comparing the local states of the local controllers of the plurality of IMSs.

In such an embodiment, the common set of graphical routines include one or more routines to analyze predictive maintenance and preventive maintenance based on the local states of the respective tool based system functions.

In such an embodiment, a further step can include:
receive, at the common GUI, user input comprising one or more set up parameters, and
transmit the received one or more set up parameters to the respective controller.

In such an embodiment, a further step can include:
remotely monitor, via the common views of the common GUI, the local states of the tool based system functions.

In such an embodiment, the common set of graphical routines can include set up wizards.

In another embodiment, a method is provided for monitoring system data received from multiple tool based independent controllers and sensors that monitor and control an injection molding process, the method comprising:
generating a common graphical interface for monitoring system parameters of an injection molding process, the common graphical interface being configured to display graphical content items relating to the system parameters in one or more display regions;
receiving system data inputs from the multiple tool based independent controllers and sensors, wherein the multiple tool based independent controllers and sensors monitor and control the system parameters of an injection fluid distribution system that receives an injection fluid from an injection molding machine for delivery of the fluid to an injection mold;

updating the common graphical interface by displaying the received system data inputs in one or more of the graphical content items in the display regions of the graphical interface.

In such an embodiment, the system parameters can include one or more of:
hot runner temperature or pressure,
valve gate opening or closing,
mold temperature or pressure,
valve pin position or speed,
mold cycle;
mold location,
mold maintenance, and
part quality.

In such an embodiment, a further step can include:
aggregating the received system data inputs for storage in a data repository.

In such an embodiment, a further step can include:
receiving user input, related to one or more system parameters, from the common graphical interface, and
based on the received user input, updating the graphical content items of the display for the related system parameters.

In such an embodiment, the receiving step can comprise receiving system data inputs from the multiple independent tool based controllers and sensors of multiple injection molding systems in a plurality of geographically different locations, and the generating and updating steps comprises generating and displaying graphical content items for system parameters of the multiple injection molding systems based on the received system data inputs.

In such an embodiment, the graphical content items can be displayed in different regions of the display.

In such an embodiment, the graphical content items can include user selectable icons.

In such an embodiment, a further step can include:
receiving from the common graphical interface a request for selecting one of the graphical content items.

In such an embodiment, a further step can include:
receiving from the common graphical interface a request for moving one of the graphical content items from one location of the display to another location of the display.

In such an embodiment, the common graphical interface can comprise a client application running on a client computing device.

In such an embodiment, the content item can comprise a visual representation of one or more system parameters over a period of time.

In such an embodiment, the system data inputs can be triggered by detection of system activity by one or more sensors of the injection molding system that monitor one or more of the system parameters.

In such an embodiment, the graphical content item can be provided in the display as, or within, thumbnails, windows, tabs, frames, visual elements, interface objects, channels, files, and display regions.

In such an embodiment, one of the graphical content items of the display can comprise an active object.

In such an embodiment, a further step can include:
receiving from the common graphical interface, a request to store a present state of the active object, and
storing the present state in a data repository.

In such an embodiment, a further step can include:
receiving from the common graphical interface, a request to modify a present state of the active object,
generating a modified state of the active object based on the request, and
sending the modified state of the active object to one or more of the independent controllers.

In such an embodiment, the independent controllers can engage in network communications with the common graphical interface.

In another embodiment, a method is provided comprising:
establish a common graphical user interface (common GUI) for viewing system parameters of a tool based injection molding system (IMS), the IMS including a plurality of different local controllers that control different tool based system functions of the IMS and one common graphical user interface (local GUI) with GUI routines specific to the local controllers for set up and monitoring of the respective tool based system function of the respective local controllers;
provide set up parameters, to each of the local controllers, for establishing the injection molding processes
receive, from each of the local controllers, data indicating a local state of the respective tool based system function;
propagate to the common GUI one or more common views of the set up parameters and received local states of the various tool based system functions, the common views comprising a common set of graphical routines for set up and monitoring of the tool based system functions of the IMS and for providing input to one or more of the local controllers In another embodiment, a non-transitory computer-readable storage medium is provided comprising:
instructions stored therein which, when executed by one or more processors, cause the one or more processors to:
establish a common graphical user interface (common GUI) for viewing system parameters of a tool based injection molding system (IMS), the IMS including a plurality of different local controllers that control different tool based system functions of the IMS and one common graphical user interface (local GUI) with GUI routines specific to the local controllers for set up and monitoring of the respective tool based system function of the respective local controllers;
provide set up parameters, to each of the local controllers, for establishing the injection molding processes
receive, from each of the local controllers, data indicating a local state of the respective tool based system function;
propagate to the common GUI one or more common views of the set up parameters and received local states of the various tool based system functions, the common views comprising a common set of graphical routines for set up and monitoring of the tool based system functions of the IMS and for providing input to one or more of the local controllers.

DETAILED DESCRIPTION OF THE INVENTION

Figure 1:
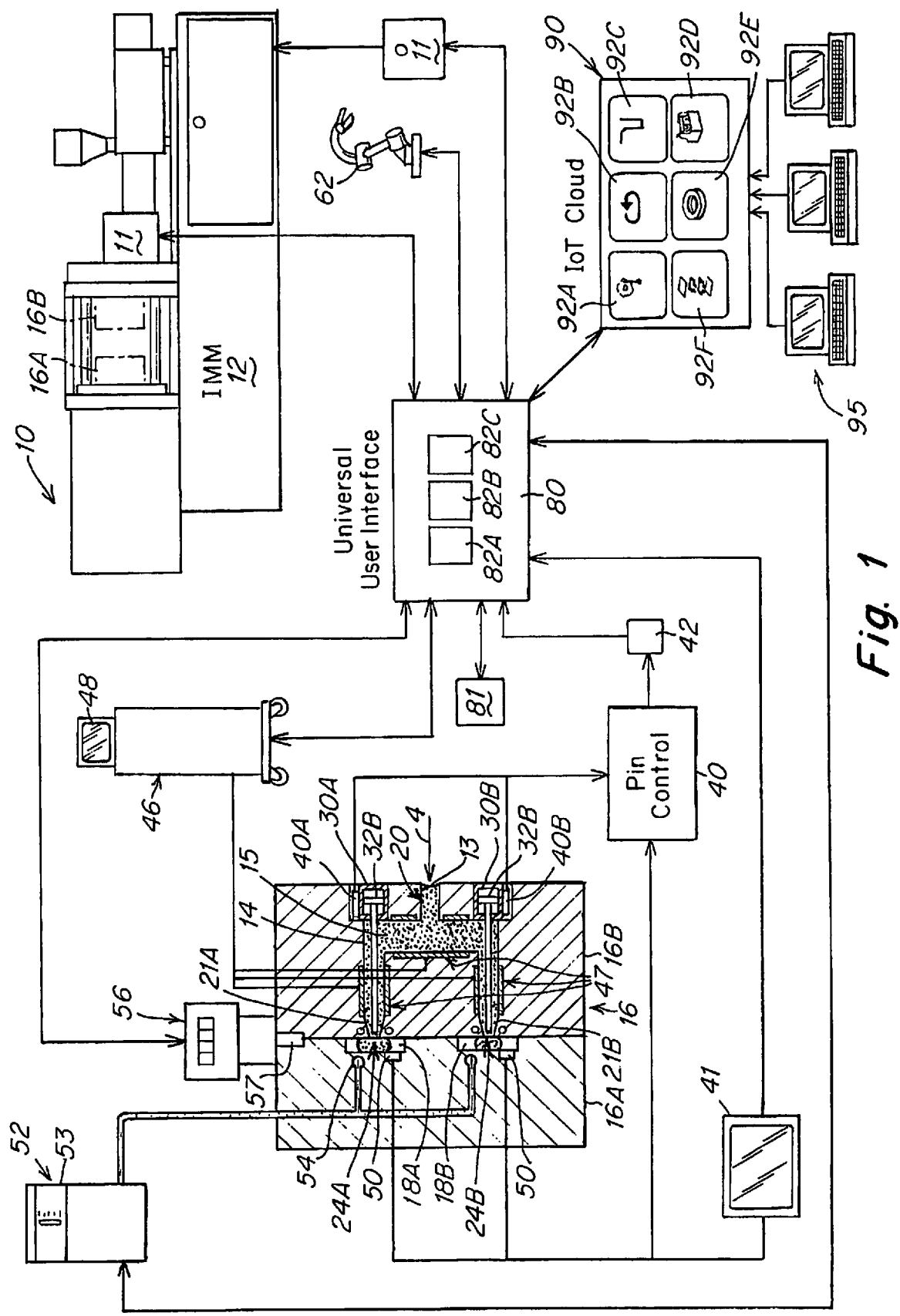
FIG. 1 is a schematic view of one embodiment of the invention depicting an injection molding system having multiple local controllers and a common (universal) user interface to illustrate various aspects of the invention.

FIG. 1 is a schematic view of a plastic injection molding apparatus for implementing a common graphical interface that communicates (e.g., in computer networked configuration) with multiple tool based independent controllers and sensors that monitor and control an injection molding process according to one embodiment of the invention. The injection molding system (IMM) 10 includes an injection molding machine 12 and a mold tool 16 (also referred to as a mold assembly), the tool 16 typically including a mold 16A, 16B having one or more mold cavities 18 and a hot runner 14 system that includes a valve gating system 20 including a plurality of nozzles 21 that feed the mold cavities, and an actuator 30 associated with each nozzle. The system further includes multiple controllers and sensors as described further below.

The IMM system illustrated in FIG. 1 includes a plurality of mold cavity sensors 50 that detect a physical property of the mold or a fluid material in the mold cavity (e.g., temperature or pressure sensors), the sensor output being fed to a local controller 40 and associated display 41 that, together with a local user interface 42 (that accepts input from a human operator) is used to monitor and control the conditions in the tool 16 and/or the fluid material in the mold cavities 18. The cavity sensor output can be used for calculating fluid material viscosity, control loop control and for quality control. The system conditions are further monitored by heaters and thermocouples (TCs) 47, shown here lying adjacent to the nozzles 21 in the tool 16. The heaters and thermocouples are monitored and controlled by a local temperature controller 56 having an associated user interface (display screen and user input device 48).

The injection molding machine 12 feeds a heated molten fluid material 4 (e.g., a plastic or polymer-based fluid material through a main inlet 13 to a distribution channel 15 of the hot runner (manifold) 14. The distribution channel feeds the fluid material to (in the illustrated embodiment) two separate nozzles 21A and 21B which in turn respectively feed the fluid material into two separate cavities 18A and 18B of the tool 16, i.e., each nozzle 21A, 21B having a respective gate 24A, 24B that feeds a respective cavity 18A, 18B of the mold 16. A mold cooling apparatus 52 includes a local mold cooling controller 53 that monitors and controls the delivery of cooling fluid to cooling channels 54 in the mold 16 to regulate the temperature of the mold cavities 18. Another local mold controller 56 monitor and controls opening and closing of the mold halves (16A and 16 B) via a sensor 57 located at the junction of the mold halves.

Each nozzle 21A, 21B is actuated by an associated actuator 30A, 30B respectively, wherein each actuator drives an associate valve pin 26A, 2B in the associated nozzle, the respective valve pin being driven reciprocally along an axial upstream and downstream path of travel through a flow passage in the nozzle, between a downstream gate closed position (GCP) and an upstream gate open position (GOP), and vice versa. Each actuator has a piston 32A, 32B, controlled for example by a solenoid valve, for moving the associated valve pin between the GOP and GCP positions. A position sensor 40A, 40B detects the position of the piston 32A, 32B and thus the position of the associated valve pin, between GOP and GCP. The local pin controller 40 monitors and controls the positioning of the valve pins (via actuators 32), as well as the mold cavity conditions via the cavity sensors, such that pin position and cavity temperature can be viewed by the local operator on the local display screen 41. The operator can further input set up parameters and/or adjust the system parameters via the local user interface input device 42.

Figure 2:
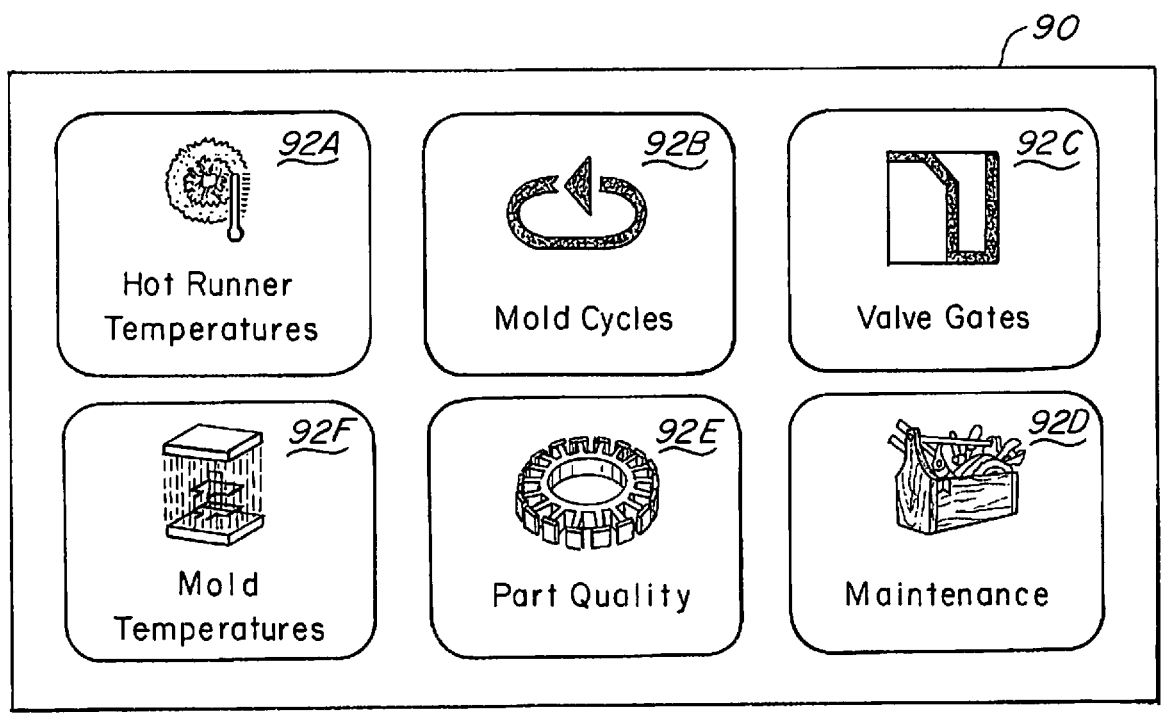
FIG. 2 is a schematic illustration of one view of the common user interface showing multiple graphical content items for selection by the user.

In accordance with one embodiment of the invention disclosed in FIGS. 1-2, a common (universal) graphical interface 80 is now provided that communicates with a plurality of the previously described local controllers and sensors. More specifically, the common graphical interface 80 is a computer implemented device for monitoring system data from multiple independent tool based controllers and sensors that monitor and control an injection process. In the present embodiment the interface receives system data from the valve pin controller 40 (which includes data from cavity sensors 50 and valve pin position sensors 40), temperature controller 46 (which includes data from the heaters and thermocouples 47), controller 56 that transmits system data relating to opening and closing of the mold halves (e.g., counting mold cycles) or other mold activity such as tracking the location of a mold, temperature readings, and pressure readings, and mold cooling controller 54 (that includes data relating to the cooling fluid circulated in the cooling channels of the mold tool). The common interface 80 may further receive data from the injection molding machine 12, via the local machine controller 11, that includes a local user interface and display device and transmits data relating to the barrel (e.g., screw position or barrel temperature) and/or the material in the barrel that is being processed and then fed to the inlet 13 to the manifold 14. The common interface may further receive input from a local robot 62 associated with the mold, that picks up the molded parts from the mold cavities for cooling and delivery to other locations. The robot may further include a local controller and/or local user interface. The common interface may store the received data (local state of the various system parameters) in a storage device 81. The individual controllers that communicate with the common graphical interface may or may not have their own local GUI; by providing the common GUI, the local GUI is not necessary.

The common graphical interface 80 has a common graphical user interface (GUI) for viewing system parameters of the tool based injection molding system 10, wherein the common graphical interface includes a common set of graphical routines for set up and monitoring of the tool based system functions of the IMS and for providing inputs to the local controllers. The interface includes a display screen, which may be a touch screen, for both displaying and receiving user input to select among the common routines, and/or to select among the various system parameters or common views output on the display screen. The display includes, in one or more portions of the display, graphical content items 82A, 82B, 82C relating to the system parameters. The system parameters my include one or more of:
- hot runner temperature or pressure,
- valve gate opening or closing,
- mold temperature or pressure,
- valve pin position or speed,
- mold cycle;
- mold location,
- mold maintenance, and
- part quality.

The common set of graphical routines may include common icons, colors and graphical details. The common routines may further include one or more routines to analyze predictive maintenance and preventive maintenance based on the local states of the respective tool based system functions.

In one embodiment, the common graphical interface enables a user (human) to remotely access the interface via a remote computer device 90 (e.g., a client computing device, such as desktop computer 95 as shown in FIG. 1, or a hand held tablet or phone). The remote computing device displays content items 92 on different regions of the display screen, and accepts input (user requests) to the remote computing device for selecting among the common routines, the common views, and the system parameters, in order to view the local state of the various system parameters. It also allows the user to input set up parameters or otherwise provide user input that is then transmitted to the local controllers for controlling the IMS system parameters. FIG. 2 shows a remote client computing device 90 having a display screen and user input device, and illustrating one common view of the graphical interface with a plurality of content items 92A-92F, namely:

Content item or view 92A relating to hot runner temperatures,

Content item or view 92B relating to mold cycles,

Content item or view 92C relating to valve gates,

Content item or view 92D relating to mold tool maintenance,

Content item or view 92E relating to molded part quality, and

Content item or view 92F relating to mold temperatures. The remote access may be via the Internet, or via applications and data stored on the Cloud.

Figure 3:
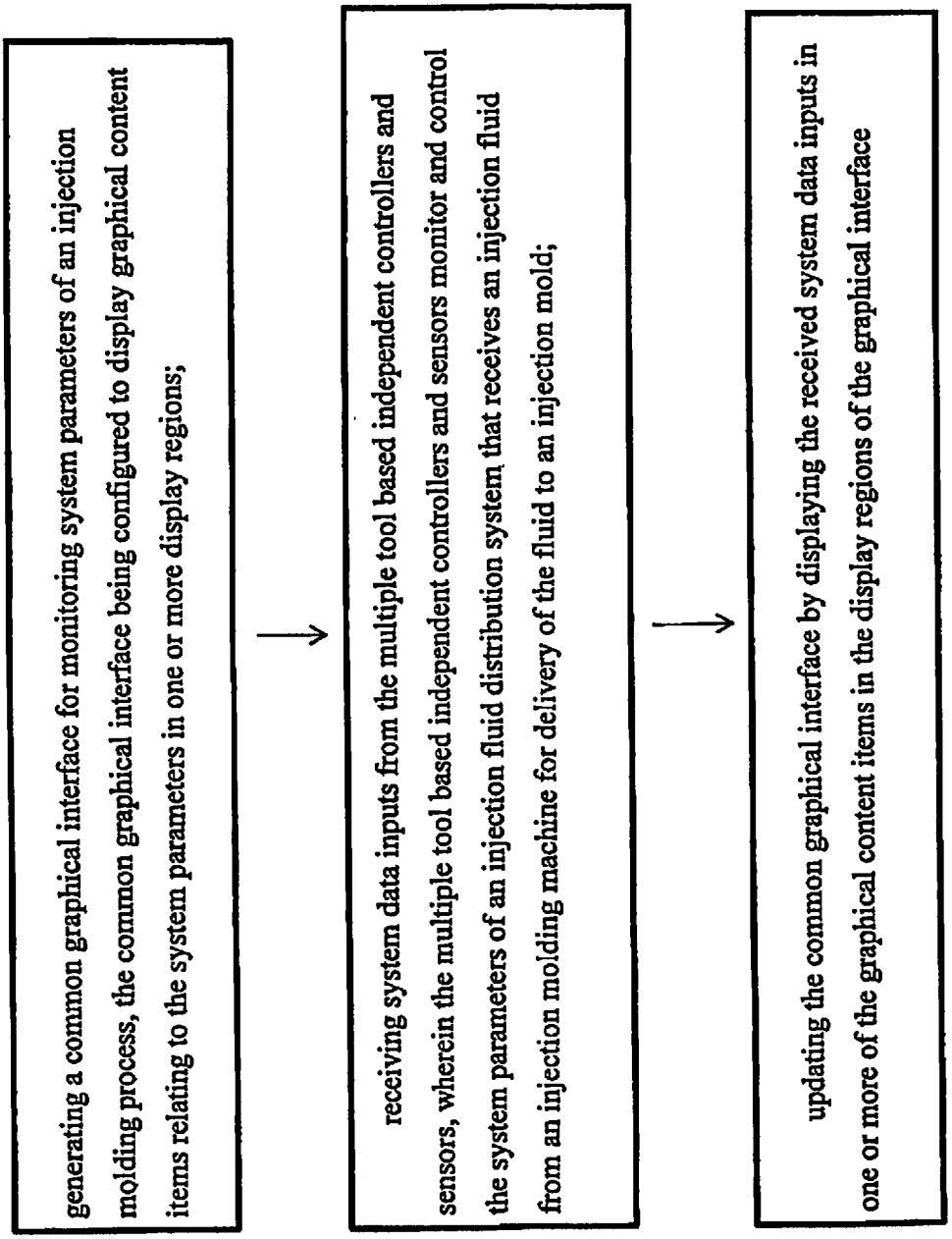
FIG. 3 illustrates a method of monitoring system data received from multiple independent controllers that monitor and control an injection molding process.

FIG. 3 illustrates a method, according to one embodiment of the invention, for monitoring system data received from multiple tool based independent controllers and sensors that monitor and control an injection molding process, the method comprising:

generating a common graphical interface for monitoring system parameters of an injection molding process, the common graphical interface being configured to display graphical content items relating to the system parameters in one or more display regions;

receiving system data inputs from the multiple tool based independent controllers and sensors, wherein the multiple tool based independent controllers and sensors monitor and control the system parameters of an injection fluid distribution system that receives an injection fluid from an injection molding machine for delivery of the fluid to an injection mold;

updating the common graphical interface by displaying the received system data inputs in one or more of the graphical content items in the display regions of the graphical interface.

Computing Device

Figure 4:
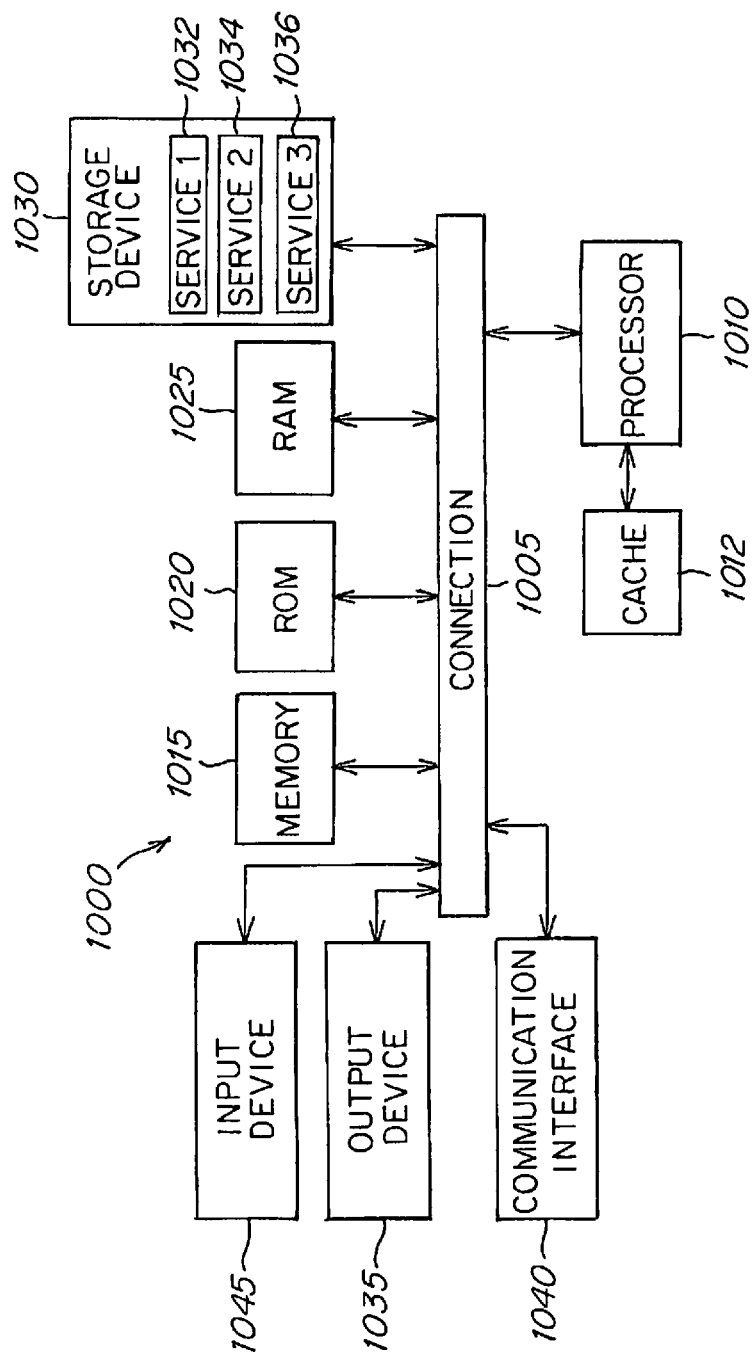
FIG. 4 illustrates an example of a computing device.

FIG. 4 illustrates an example computing system architecture 1000 wherein the components of the system 1000 are in communication with each other using a connection 1005. Connection 1005 can be a physical connection via a bus, or direct connection into processor 1010 such as in a chipset architecture. Connection 1005 can also be a virtual connection, networked connection, or logical connection. The connection can be wired or wireless (such as a Bluetooth connection).

In some cases, the system 1000 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 1000 includes at least one processing unit (CPU or processor) 1010 and a connection 1005 that couples various system components including the system memory 1015, such as read only memory (ROM) 1020 and random access memory (RAM) 1025 to the processor 1010. The system 1000 can include a cache of high-speed memory 1012 connected directly with, in close proximity to, or integrated as part of the processor 1010.

The processor 1010 can include any general purpose processor and a hardware service or software service, such as service 1 1032, service 2 1034, and service 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include code that when executed by the processor 1010, causes the system 1000 to perform a function. A hardware service that performs a particular function can include the software component stored in a computer-readable medium in connection with the hardware components, such as the processor 1010, bus 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system, comprising:
a computer implemented device having a processor and at least one non-transitory computer readable medium with computer executable instructions stored thereon for execution by the processor to perform a method of communicating with and monitoring system data from a plurality of independent local tool-based controllers and sensors that monitor and control an injection molding process and which are separate from an injection molding machine-based controller, the method including the acts of:
receiving system data from two or more independent local tool-based controllers and sensors from a plurality of injection molding systems in different geographical locations, the system data having embedded therein local states of various tool-based system parameters for one or more of:
a valve pin controller which provides system data from cavity sensors and/or valve pin position sensors;
a temperature controller which provides system data from heaters and/or thermocouples;
a mold controller which provides system data relating to opening and closing of mold halves or tracking a location of a mold, temperature readings, and/or pressure readings; and
a mold cooling controller which provides system data relating to a cooling fluid circulated in cooling channels of a mold tool;
storing the received system data in a storage device; and
outputting to a common graphical user interface for display as common views the system data of the independent local tool-based controllers, wherein the common graphical user interface includes a common set of graphical routines for set up and monitoring of local tool-based system functions of the injection molding process and for providing inputs to the plurality of independent local tool-based controllers, wherein the common graphical user interface includes a common set of graphical routines for set up and monitoring of local tool-based system functions of the injection molding process and for providing inputs to the plurality of independent local tool-based controllers, wherein the common views include;
a content item relating to hot runner temperatures,
a content item relating to mold cycles,
a content item relating to valve gates,
a content item relating to mold tool maintenance,
a content item relating to molded part quality, and
a content item relating to mold temperatures.

2. The system of claim 1, wherein the system parameters include one or more of hot runner temperature or pressure, valve gate opening or closing, mold temperature or pressure, valve pin position or speed, mold cycle mold location, mold maintenance, and molded part quality.

3. The system of claim 1, wherein the common set of graphical routines include routines to control common icons, colors and graphical details regarding a predetermined system parameter.

4. The system of claim 1, wherein the common routines are configured to analyze predictive maintenance and/or preventive maintenance based on the local states of the respective tool-based system parameters.

5. The system of claim 1, wherein the common graphical user interface is remotely accessible to a human user via a remote computing device, a client computing device, a desktop computer, or a hand-held tablet or phone.

6. The system of claim 5, wherein the remote computing device displays content items on different regions of a display screen, and accepts user input to the remote computing device for selecting among the common routines, the common views, and the system parameters, to view the local state of the various system parameters.

7. The system of claim 6, wherein the remote computing device allows the human user to input set-up parameters that are then transmitted to at least one independent local tool-based controller for controlling one or more injection molding system parameters.

8. The system of claim 5, wherein the common graphical user interface is remotely accessible via the Internet, or via applications and data stored on the Cloud.

9. The system of claim 1, wherein the common graphical user interface further receives data from the injection molding machine that transmits injection molding machine-based process data relating to the barrel and/or the material in the barrel that is being processed and then fed to an inlet to a manifold.

10. The system of claim 1, wherein the common graphical user interface further receives input from a local robot associated with a mold, the local robot configured to pick up molded parts from mold cavities for cooling and delivery to other locations.

11. The system of claim 10, wherein the local robot includes a local controller.

12. The system of claim 1, wherein the common views include a visual presentation of one or more system parameters over a period of time.

13. A method, comprising
monitoring system data received from multiple independent local tool-based controllers and sensors that monitor and control a tool-based injection molding process via a common graphical user interface, the common graphical user interface arranged to display as common views system data of the independent local tool-based controllers, wherein the common graphical user interface includes a common set of graphical routines for set up and monitoring of local tool-based system functions of the injection molding process and for providing inputs to the multiple independent local tool-based controllers, wherein the common views include:
a content item relating to hot runner temperatures,
a content item relating to mold cycles,
a content item relating to valve gates,
a content item relating to mold tool maintenance,
a content item relating to molded part quality, and
a content item relating to mold temperatures, and
wherein the monitoring includes:
generating the common graphical user interface to display graphical content items relating to local states of various tool-based system parameters in one or more display regions;
receiving system data inputs from the multiple independent local tool-based controllers and sensors, wherein the multiple independent local tool based independent controllers and sensors monitor and control system parameters of an injection fluid distribution system that receives an injection fluid from an injection molding machine for delivery of the injection fluid to an injection mold; and
updating the common graphical user interface by displaying the received system data inputs in one or more of the graphical content items in the one or more display regions of the common graphical user interface.

14. The method of claim 13, wherein the monitoring further includes receiving a user input requesting display of one of more of the common views relating to one or more user selected tool-based system functions.

15. The method of claim 13, wherein the receiving system data inputs is triggered by detection of system activity by one or more sensors of at least one independent local tool-based controller arranged to monitor one or more of the various tool-based system parameters.

16. The method of claim 13, further comprising aggregating received system data inputs for storage in a data repository.

17. The method of claim 16, wherein the received system data inputs stored in the data repository include set-up parameters for multiple molds.

18. A non-transitory computer readable medium with computer executable instructions stored thereon for execution by a processor to perform a method of monitoring system data from a plurality of independent local tool-based controllers and sensors that monitor and control an injection molding process, the method comprising:
receiving system data from two or more independent local tool-based controllers and sensors from a plurality of injection molding systems in different geographical locations, the system data having embedded therein local states of various tool-based system parameters for one or more of:
a valve pin controller which provides system data from cavity sensors and/or valve pin position sensors;
a temperature controller which provides system data from heaters and/or thermocouples;
a mold controller which provides system data relating to opening and closing of mold halves or tracking a location of a mold, temperature readings, and/or pressure readings; and
a mold cooling controller which provides system data relating to a cooling fluid circulated in cooling channels of a mold tool;
storing the received system data in a storage device; and
outputting to a common graphical user interface for display as common views the system data of the independent local tool-based controllers, wherein the common graphical user interface includes a common set of graphical routines for set up and monitoring of local tool-based system functions of the injection molding process and for providing inputs to the plurality of independent local tool-based controllers, wherein the common views include:
a content item relating to hot runner temperatures,
a content item relating to mold cycles,
a content item relating to valve gates,
a content item relating to mold tool maintenance,
a content item relating to molded part quality, and
a content item relating to mold temperatures.

* * * * *